United States Patent Office 3,647,747
Patented Mar. 7, 1972

3,647,747
HIGH TEMPERATURE MOLDING FLAME RE-
TARDANT POLYCARBONATE COMPOSITION
Charles A. Bialous, Mount Vernon, Ind., assignor to
General Electric Company
No Drawing. Filed Apr. 15, 1970, Ser. No. 28,952
Int. Cl. C08g 39/10, 51/56
U.S. Cl. 260—45.75 R
6 Claims

ABSTRACT OF THE DISCLOSURE

A high temperature molding polycarbonate composition having in admixture an aromatic polycarbonate and 0.05 to about 2.0 weight percent of an alkaline earth carbonate based on the weight of the polycarbonate composition. Preferably, the alkaline earth carbonate is barium carbonate.

---

This invention relates to a thermoplastic aromatic polycarbonate composition having excellent resistance to color degradation and embrittlement at high molding temperatures, and more particularly to a flame retardant aromatic polycarbonate having in admixture therewith an alkaline earth carbonate.

It is well known in the art to prepare flame retardant polycarbonate compositions by employing halogen substituted bisphenol-A in the preparation thereof. Specifically, U.S. Pat. 3,334,154 discloses such a composition wherein tetrabromobisphenol-A is employed to prepare a polycarbonate composition having excellent flame retardant properties. Flame retardant properties of thermoplastic compositions are extremely high in demand by the industry as a safety feature requirement. In fact, many applications for thermoplastics carry the requirement that the thermoplastic be flame retardant particularly where they are used by the public or are employed in areas where the public may gather.

As thermoplastics, particularly polycarbonates, find greater use in many new applications there is a definite trend to higher molding temperatures due to the complicated geometry of the part being molded and/or thinner walled sections. Higher molding temperatures are necessary in order for the polycarbonate to fill the mold cavity and thereby produce a satisfactory molded shape even though complicated in its design. Unfortunately when employing flame retardant polycarbonate compositions as disclosed by the prior art, color degradation and embrittlement of the flame retardant polycarbonate composition has occurred due to the higher molding temperatures.

Therefore, it has now been discovered that by incorporating a particular additive with a flame retardant polycarbonate composition, color degradation and embrittlement are overcome.

Therefore, it is an object of this invention to provide a particular composition that is stable at higher temperatures.

It is a further object of this invention to provide a flame retardant polycarbonate composition having excellent resistance to color degradation at elevated temperatures.

It is another object of this invention to provide a flame retardant polycarbonate composition that is resistant to embrittlement at elevated temperatures.

These and other objects of this invention will become apparent from the following detailed description thereof.

Briefly, according to this invention, the foregoing and other objects are attained by incorporating with a flame retardant aromatic polycarbonate an alkaline earth carbonate. Specifically, the polycarbonate composition of this invention consists of in admixture a flame retardant polycarbonate and 0.05 to about 2.0 weight percent of an alkaline earth carbonate. The composition so disclosed herein is resistant to color degradation and embrittlement at elevated temperatures.

The following examples are set forth to illustrate more clearly the principle and practice of this invention to those skilled in the art. Unless otherwise specified, where parts or percents are mentioned, they are parts or percents by weight.

EXAMPLE I

A molding composition is prepared by mixing (a) 1 part of a copolymer prepared by reacting 50 weight percent of 2,2-bis(4-hydroxyphenyl) propane (hereinafter referred to as bisphenol-A), 50 weight percent of 2,2-(3,3′,5,5′ - tetrabromo - 4,4′ - dihydroxy - diphenyl) propane and phosgene in a methylene chloride reaction medium containing therein p-tertiary butylphenol, pyridine and calcium hydroxide, and (b) 4 parts of a bisphenol-A homopolymer prepared by reacting bisphenol-A with phosgene in a methylene chloride reaction medium containing therein triethylamine, p-tertiary butylphenol and calcium hydroxide. The polymer is then recovered from solution in solid form, dried overnight at 125° C. and extruded at a temperature of about 525° F. The extrudate is comminuted into pellets.

The above composition is then injection molded into test specimens of 3″ x 2″ x 0.125″ thick at a molding temperature of 710° F.

Severe color degradation occurs as observed by the dark streaks appearing in the molded shape. In addition, the molded specimens break as they are ejected from the mold indicating that the specimens are brittle.

EXAMPLE II

Example I is repeated except that 0.1 weight percent of barium carbonate is mixed with the composition of Example I based on the weight of the polycarbonate resin.

The molded specimens did not break upon ejection from the mold and no color degradation is observed.

EXAMPLE III

Example I is repeated except that 1.5 weight percent of barium carbonate is mixed with the composition of Example I and the test specimens are injection molded at a temperature of 740° F.

The molded specimens did not break upon ejection from the mold and no color degradation is observed.

EXAMPLE IV

Example II is repeated except that calcium carbonate is employed herein in place of barium carbonate.

The results obtained are the same as those obtained in Example II.

EXAMPLE V

Example II is repeated except that magnesium carbonate is employed herein in place of barium carbonate.

The results obtained are the same as those obtained in Example II.

EXAMPLE VI

Example II is repeated except that 5 parts of a copolymer prepared by reacting 90 weight percent of bisphenol-A and 10 weight percent of 2,2-(3,3′,5,5′-tetrabromo-4,4′-dihydroxy diphenyl) propane are employed herein in place of the mixture of the bisphenol-A homopolymer and the copolymer employed in Example II.

The results obtained are the same as those obtained in Example II.

EXAMPLE VII

Example VI is repeated except that a copolymer of bisphenol-A and 2,2-(3,3',5,5'-tetrachloro-4,4'-dihydroxy-diphenyl) propane are employed herein instead of the copolymer of Example VI.

The results obtained are the same as the results obtained in Example VI.

As shown in the examples, the use of an alkaline earth carbonate greatly enhances the properties of a flame retardant polycarbonate so as to allow the molding thereof at elevated temperatures without color degradation or embrittlement.

The instant invention is directed to a polycarbonate composition and more particularly to a flame retardant polycarbonate composition having excellent resistance to color degradation and embrittlement when molded at higher temperatures. More particularly, the composition consists of in admixture an aromatic polycarbonate and 0.05 to about 2.0 weight percent of an alkaline earth carbonate based on the total weight of the composition. The aromatic polycarbonate employed herein may be either (a) homopolymers of a halogen substituted dihydric phenol, (b) copolymers of an unsubstituted dihydric phenol and a halogen substituted dihydric phenol, (c) mixtures of (a) and (b) or (d) mixtures thereof with homopolymers of an unsubstituted dihydric phenol. Preferably, the mixture may be 30–99 weight percent and more particularly 70–99 weight percent of a homopolymer of an unsubstituted dihydric phenol and, correspondingly, 70–1 weight percent and more particularly, 30–1.0 weight percent of a copolymer of (1) 75–25 weight percent of a halogen substituted dihydric phenol and, correspondingly, (2) 25–75 weight percent of a dihydric phenol. More particularly, the preferred system above employs a tetra halogen substituted dihydric phenol. The weight percent of the above is based on the total weight of the mixture.

In general, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed in the practice of this invention are bis(4-hydroxyphenyl) methane,
2,2-bis(4-hydroxyphenyl) propane (bisphenol-A),
2,2-bis(4-hydroxy-3-methylphenyl) propane,
4,4-bis(4-hydroxyphenyl) heptane,
2,2-(3,3',5,5'-tetrachloro-4,4'-dihydroxy-diphenyl)
    propane (tetrachlorobisphenol-A),
2,2-(3,3',5,5'-tetrabromo-4,4'-dihydroxy-diphenyl)
    propane (tetrabromobisphenol-A),
3,3'-dichloro-4,4'-dihydroxy-diphenyl methane, etc.

Other dihydric phenols of the bisphenol type are also available and are disclosed in U.S. Pats. 2,999,835, 3,028,365 and 3,334,154.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonates esters or haloformates.

The acid acceptors, molecular weight regulators and catalysts employed in the process of preparing polycarbonates are well known in the art and may be any of those commonly used to prepare polycarbonates.

As stated previously, the particular additive employed herein to provide the polycarbonate composition having excellent resistance to color degradation and resistance to brittleness at the higher molding temperatures is an alkaline earth carbonate. The alkaline earth carbonates that may be employed herein are barium carbonate, strontinum carbonate, calcium carbonate, magnesium carbonate and beryllium carbonate. The preferred carbonate to be employed in the practice of this invention is barium carbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A polycarbonate composition consisting of in admixture an aromatic polycarbonate of a dihydric phenol and a carbonate precursor and 0.05 to about 2.0 weight percent of an alkaline earth carbonate based on the total weight of the polycarbonate composition; said aromatic polycarbonate being selected from the group consisting of (a) a polycarbonate of a halogen substituted dihydric phenol, (b) a copolycarbonate of an unsubstituted dihydric phenol and a halogen substituted dihydric phenol, (c) mixtures of (a) and (b) and (d) mixtures of a member selected from the group consisting of (a), (b) and (c) with a polycarbonate of an unsubstituted dihydric phenol; said halogen being selected from the group consisting of bromine, and chlorine.

2. The composition of claim 1 wherein the aromatic polycarbonate is a mixture of 30–99 weight percent of a polycarbonate of a dihydric phenol and correspondingly, 70–1 weight percent of a copolycarbonate of 25–75 weight percent of a dihydric phenol and 75–25 weight percent of a tetrahalogenated dihydric phenol; said halogen being selected from the group consisting of bromine and chlorine.

3. The composition of claim 1 wherein the aromatic polycarbonate is a copolycarbonate of bisphenol-A and tetrachloro bisphenol-A.

4. The composition of claim 1 wherein the aromatic polycarbonate is a copolycarbonate of bisphenol-A and tetrabromo bisphenol-A.

5. The composition of claim 1 wherein the aromatic polycarbonate is a polycarbonate of tetrabromo bisphenol-A.

6. The composition of claim 1 wherein the alkaline earth carbonate is barium carbonate.

References Cited

UNITED STATES PATENTS

| | | | |
|---|---|---|---|
| 3,038,874 | 6/1962 | Laakso | 260—474 |
| 3,119,787 | 1/1964 | Laakso | 260—474 |
| 3,334,154 | 8/1967 | Kim | 260—474 |
| 3,468,839 | 9/1969 | Millane | 260—37 |
| 3,475,372 | 10/1969 | Gable | 260—45.75 |

WILLIAM H. SHORT, Primary Examiner

E. WOODBERRY, Assistant Examiner

U.S. Cl. X.R.

260—860

Notice of Adverse Decision in Interference

In Interference No. 98,896, involving Patent No. 3,647,747, C. A. Bialous, HIGH TEMPERATURE MOLDING FLAME RETARDANT POLYCARBONATE COMPOSITION, final judgment adverse to the patentee was rendered Oct. 11, 1977, as to claims 1, 2, 4, 5 and 6.

[*Official Gazette February 14, 1978.*]